(12) United States Patent
Feutz (10) Patent No.: US 7,891,455 B2
(45) Date of Patent: Feb. 22, 2011

(54) SNOWMOBILE CONVERSION KIT

(76) Inventor: James Kevin Feutz, 5036 7 Mile, NE., Belmont, MI (US) 49306

( * ) Notice: Subject to any disclaimer, the term of this patent is extended or adjusted under 35 U.S.C. 154(b) by 273 days.

(21) Appl. No.: 12/196,615

(22) Filed: Aug. 22, 2008

(65) Prior Publication Data

US 2010/0044134 A1 Feb. 25, 2010

(51) Int. Cl.
B62D 61/06 (2006.01)
(52) U.S. Cl. .................................................. 180/210
(58) Field of Classification Search ................ 180/210; 280/124.128, 124.113
See application file for complete search history.

(56) References Cited

U.S. PATENT DOCUMENTS

| | | |
|---|---|---|
| 3,480,096 A | 11/1969 | Hammitt |
| 3,521,717 A | 7/1970 | Coons |
| 3,664,447 A | 5/1972 | Kane |
| 3,774,706 A | 11/1973 | Kiekhaefer |
| 4,082,155 A | 4/1978 | McCartney |
| 4,195,702 A | 4/1980 | Denis |
| 4,204,582 A | 5/1980 | Van Soest |
| 4,662,468 A | 5/1987 | Ethier |
| 4,719,982 A | 1/1988 | Shaver |
| 4,787,470 A | 11/1988 | Badsey |
| 5,564,517 A | 10/1996 | Levasseur |
| 5,960,901 A * | 10/1999 | Hanagan ..................... 180/210 |
| 6,446,744 B2 | 9/2002 | Wubbolts et al. |
| 6,655,487 B2 | 12/2003 | Mallette et al. |
| D485,788 S | 1/2004 | Guay et al. |
| 6,866,110 B2 | 3/2005 | Mallette et al. |
| 6,942,051 B2 | 9/2005 | Mallette et al. |
| 6,948,581 B2 * | 9/2005 | Fecteau et al. .............. 180/210 |
| 7,237,637 B2 | 7/2007 | Fecteau et al. |
| 7,513,327 B1 * | 4/2009 | Peterson ..................... 180/183 |
| 7,543,672 B2 * | 6/2009 | Codere et al. ............... 180/210 |
| 7,784,805 B2 * | 8/2010 | Morgan ................ 280/124.134 |
| 2001/0040064 A1 | 11/2001 | Girouard et al. |
| 2002/0129983 A1 | 9/2002 | Wubbolts et al. |
| 2002/0129984 A1 | 9/2002 | Wubbolts et al. |
| 2003/0201127 A2 | 10/2003 | Girouard et al. |
| 2003/0221890 A1 | 12/2003 | Fecteau et al. |
| 2003/0221891 A1 | 12/2003 | Fecteau et al. |
| 2004/0026146 A1 | 2/2004 | Mallette et al. |
| 2004/0035623 A1 | 2/2004 | Fecteau et al. |
| 2004/0035624 A1 | 2/2004 | Fecteau et al. |
| 2004/0035625 A1 | 2/2004 | Talbot et al. |
| 2004/0035626 A1 | 2/2004 | Girouard et al. |
| 2004/0050605 A1 | 3/2004 | Fecteau et al. |
| 2004/0129473 A1 | 7/2004 | Talbot et al. |
| 2004/0140140 A1 | 7/2004 | Guay et al. |

(Continued)

*Primary Examiner*—Kevin Hurley
(74) *Attorney, Agent, or Firm*—Price, Heneveld, Cooper, DeWitt & Litton, LLP (57) ABSTRACT

A conversion kit for converting a snowmobile into a wheeled road vehicle, includes first and second front wheel assemblies. First and second spindle plates have a mount bracket, a strut bracket, a torsion bar bracket, and first and second kingpin assemblies. The kingpin assemblies on the first and second spindle plates connect with the first and second front wheel assemblies. A trailing arm is integrally connected with the spindle plate and extends rearwardly therefrom. A rear wheel assembly is rotatably connected with the snowmobile and has a rear wheel sprocket fixedly connected thereto. A drive shaft is connected to a power source on the snowmobile and a drive belt connects the drive shaft to the rear wheel sprocket.

14 Claims, 8 Drawing Sheets

U.S. PATENT DOCUMENTS

| | | |
|---|---|---|
| 2005/0121244 A1 | 6/2005 | Mallette et al. |
| 2005/0247507 A1 | 11/2005 | Fecteau et al. |
| 2006/0090939 A1 * | 5/2006 | White ................... 180/9.26 |
| 2006/0254842 A1 | 11/2006 | Dagenais et al. |
| 2010/0171282 A1 * | 7/2010 | MacIsaac ............. 280/124.103 |

* cited by examiner

SNOWMOBILE CONVERSION KIT

BACKGROUND OF THE PRESENT INVENTION

The present invention relates to a conversion kit, and more particularly, to a conversion kit for converting a snowmobile to a wheeled vehicle.

SUMMARY OF THE INVENTION

One aspect of the present invention includes a conversion kit for converting a snowmobile into a wheeled road vehicle. The conversion kit includes first and second front wheel assemblies with first and second spindle plates having a mount bracket, a strut bracket, a torsion bar bracket, and first and second kingpin assemblies. The kingpin assemblies on the first and second spindle plates connect with the first and second front wheel assemblies. A trailing arm is integrally connected with the spindle plate and extends rearwardly therefrom. A rear wheel assembly is rotatably connected with the snowmobile and has a rear wheel sprocket fixedly connected thereto. A drive shaft is connected to a power source on the snowmobile and a drive belt connects the drive shaft to the rear wheel sprocket.

Another aspect of the present invention includes an improvement in a conversion kit that converts a snowmobile into a three-wheeled road vehicle. The improvement includes a spindle plate having an internal side with a mounting bracket, a strut bracket, and a torsion bar bracket. The spindle plate also includes an external side with first and second kingpin assemblies designed for engagement with a wheel assembly. A trailing arm is connected with the internal side of the spindle plate and extends in a rearwardly direction therefrom. A rear swing arm is attached to the snowmobile and is rotatably connected with a rear wheel assembly. The rear wheel assembly includes a rear wheel with a rear wheel sprocket fixedly connected thereto. A drive shaft is connected to a power source on the snowmobile and a drive belt is connected from the drive shaft to the rear wheel sprocket.

In another aspect of the present invention, a method of converting a snowmobile into a wheeled vehicle includes disconnecting the shock and strut assemblies on the snowmobile from the first and second skis, removing the first and second skis, and removing the snowmobile track. First and second spindle plates are installed that have a mount bracket, strut bracket, torsion bar bracket and a trailing arm. First and second wheel assemblies are then connected to the first and second spindle plates, respectively. Struts on the snowmobile are connected to the first and second spindle plates and a torsion bar is installed that is connected with both the first and second spindle plates.

These and other features, advantages and objects of the present invention will be further understood and appreciated by those skilled in the art upon studying the following specification, claims, and appended drawings.

DETAILED DESCRIPTION OF PREFERRED EMBODIMENTS

Figure 1:
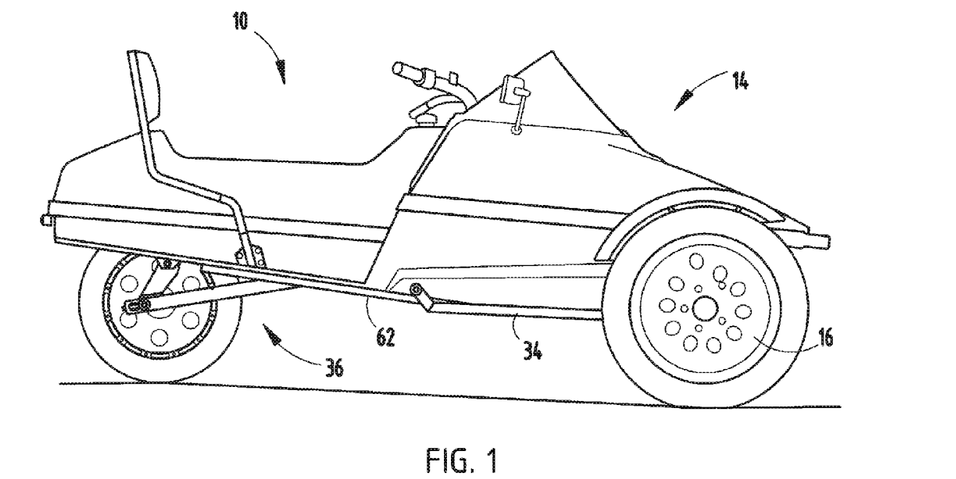
FIG. 1 is a side elevational view of one embodiment of a conversion kit of the present invention installed on a snowmobile to form a wheeled vehicle.

For purposes of description herein the terms "upper", "lower", "right", "left", "rear", "front", "vertical", "horizontal" and derivatives thereof shall relate to the invention as oriented in FIG. 1. However, it is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 3:
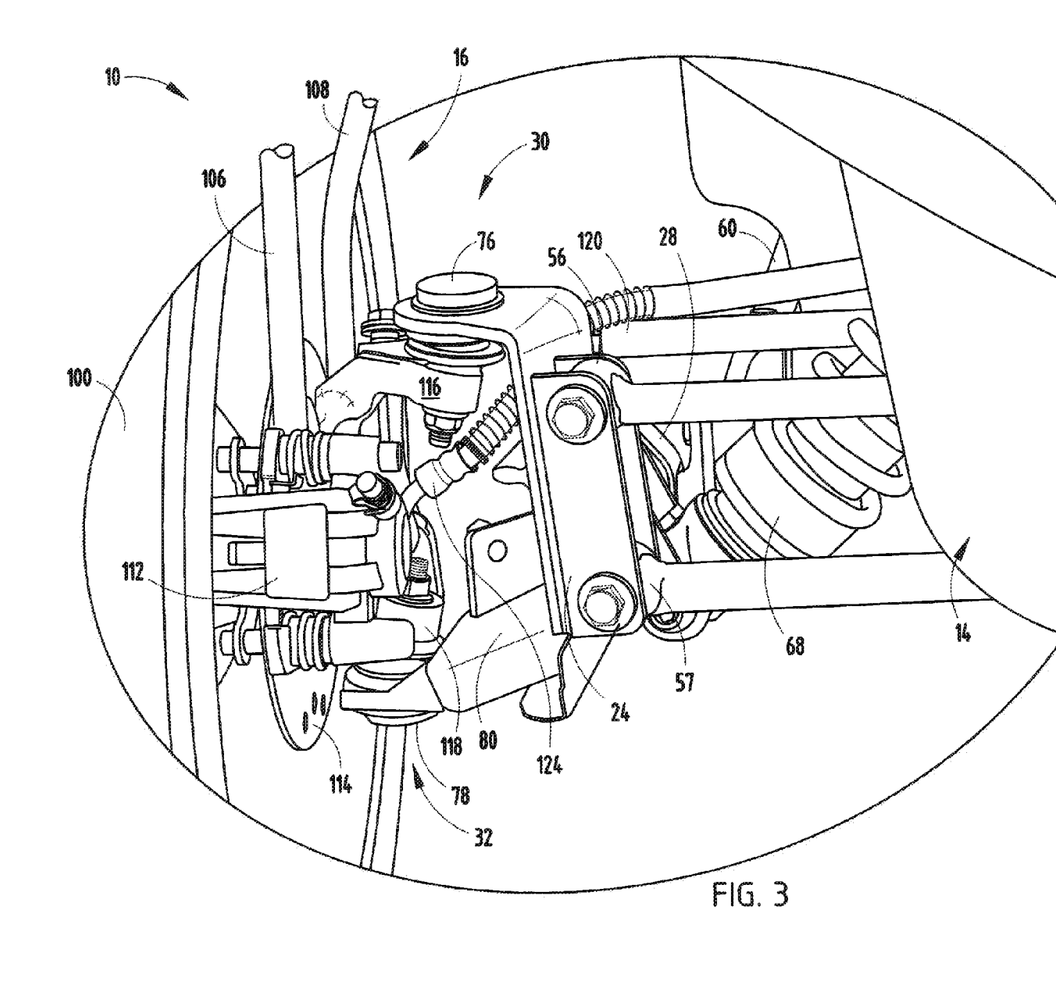
FIG. 3 is an enlarged view of a wheel assembly of the wheeled vehicle of FIG. 2.

The reference numeral 10 shown in the embodiment illustrated in FIGS. 1 and 3 generally designates a conversion kit for converting a snowmobile 12 into a wheeled vehicle 14. The conversion kit 10 includes first and second front wheel assemblies 16, 18 as well as first and second spindle plates 20, 22 that have a mount bracket 24, a strut bracket 26, a torsion bar bracket 28, and first and second kingpin assemblies 30, 32. The first and second kingpin assemblies 30, 32 on the first and second spindle plates 20, 22 connect with the first and second front wheel assemblies 16, 18. A trailing arm 34 is integrally connected with each spindle plate 20, 22 and extends rearwardly therefrom. A rear wheel assembly 36 is rotatably connected with the wheeled vehicle 14 and has a rear wheel sprocket 38 fixedly connected thereto. A drive shaft 40 is connected to a power source on the wheeled vehicle 14 and a drive belt 44 connects the drive shaft 40 to the rear wheel sprocket 38.

Figure 1A:
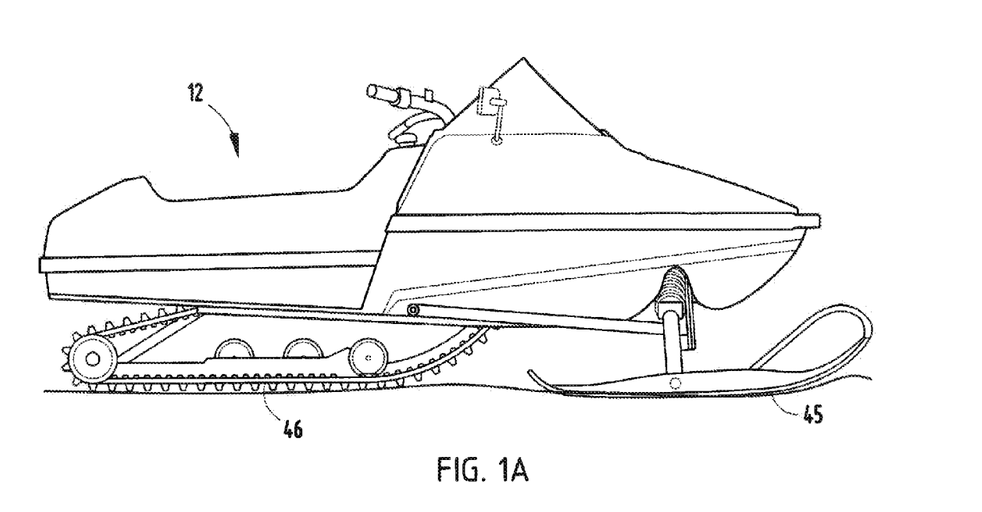
FIG. 1A is a side elevational view of a snowmobile upon which the conversion kit of FIG. 1 may be installed.
Figure 2:
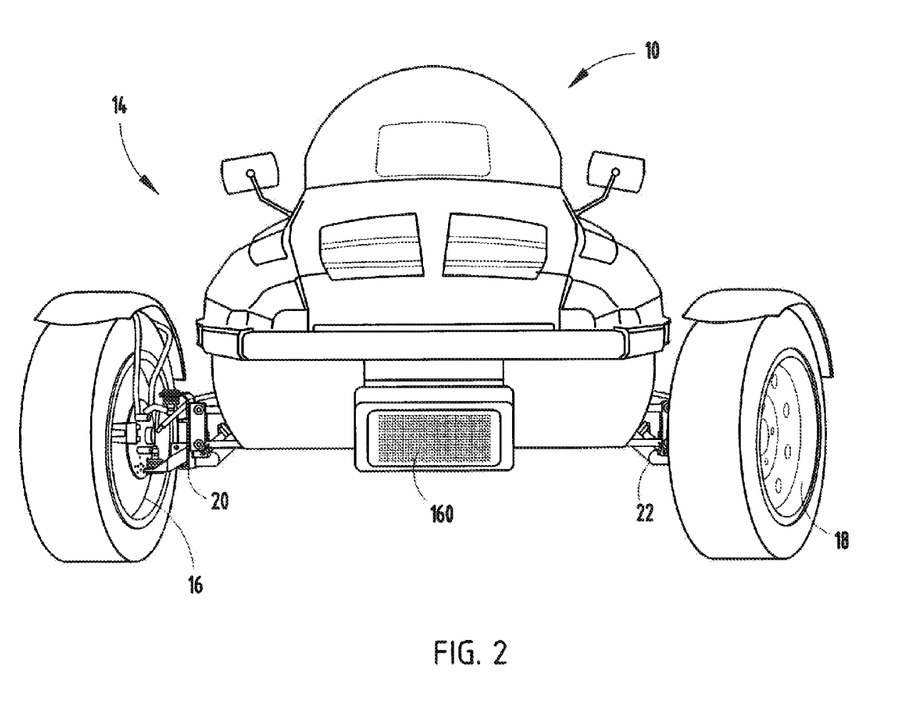
FIG. 2 is a front elevational view of the wheeled vehicle of FIG. 1.

As shown in FIGS. 1, 1A and 2, the conversion kit 10 modifies a typical snowmobile 12 such that it may be used when snow does not cover the ground. The first and second front wheel assemblies 16, 18 take the place of front skis 45 on the snowmobile 12, and the track 46, which generally pushes the snowmobile 12 along the ground, is replaced by a rear wheel assembly 36. It is contemplated that the conversion kit 10 will include various other minor modifications not disclosed herein for different snowmobile 12 designs. Accordingly, the size and shape of several of the conversion aspects and elements disclosed herein should be understood to be variable to accommodate different snowmobile 12 designs.

Figures 4, 5, 6, 7, 8:
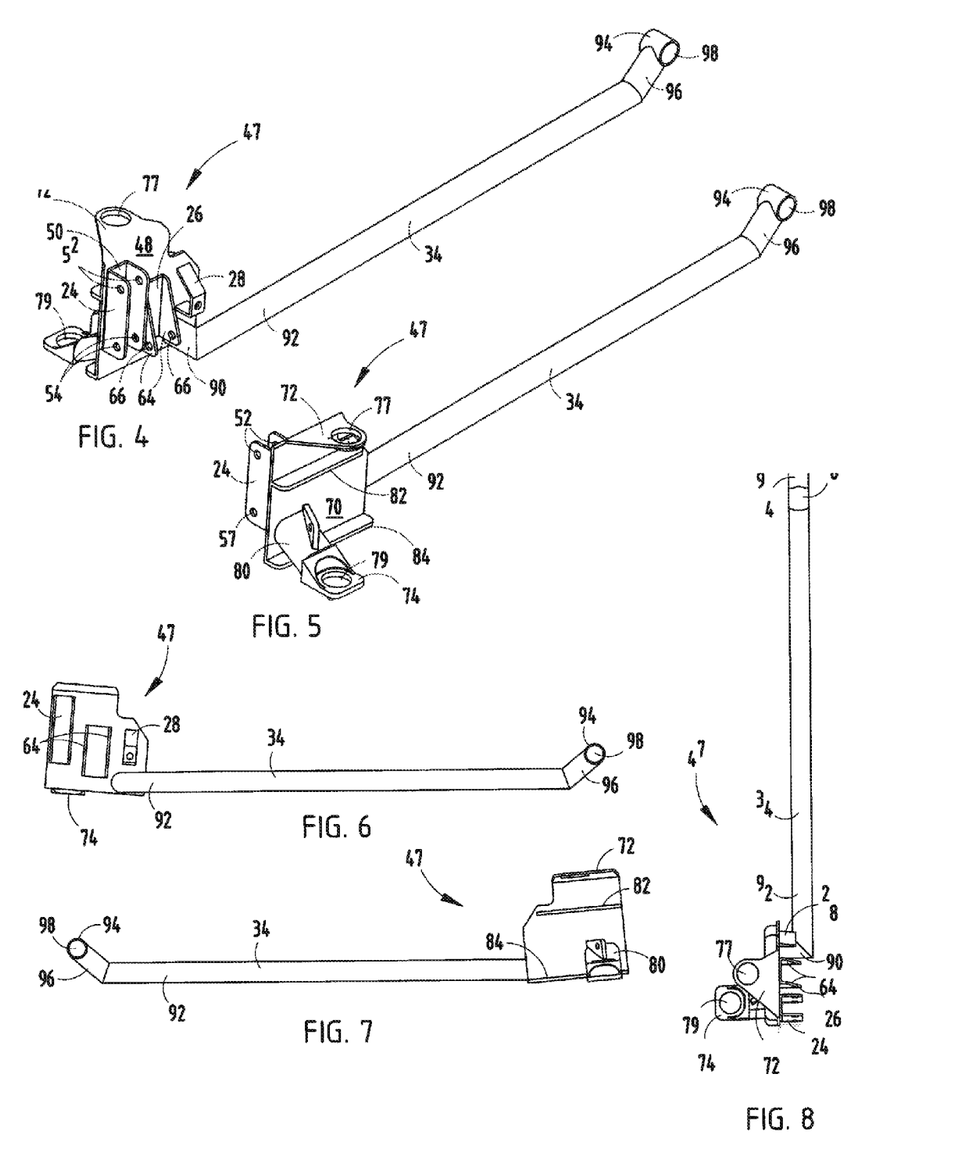
FIG. 4 is a top perspective view of a first spindle assembly.
FIG. 5 is a top perspective view of a second spindle assembly having a mirror image construction to the first spindle assembly.
FIG. 6 is an interior side elevational view of the spindle assembly of FIG. 4.
FIG. 7 is an exterior side elevational view of the spindle assembly of FIG. 4.
FIG. 8 is a top side elevational view of the spindle assembly of FIG. 4.
Figure 10:
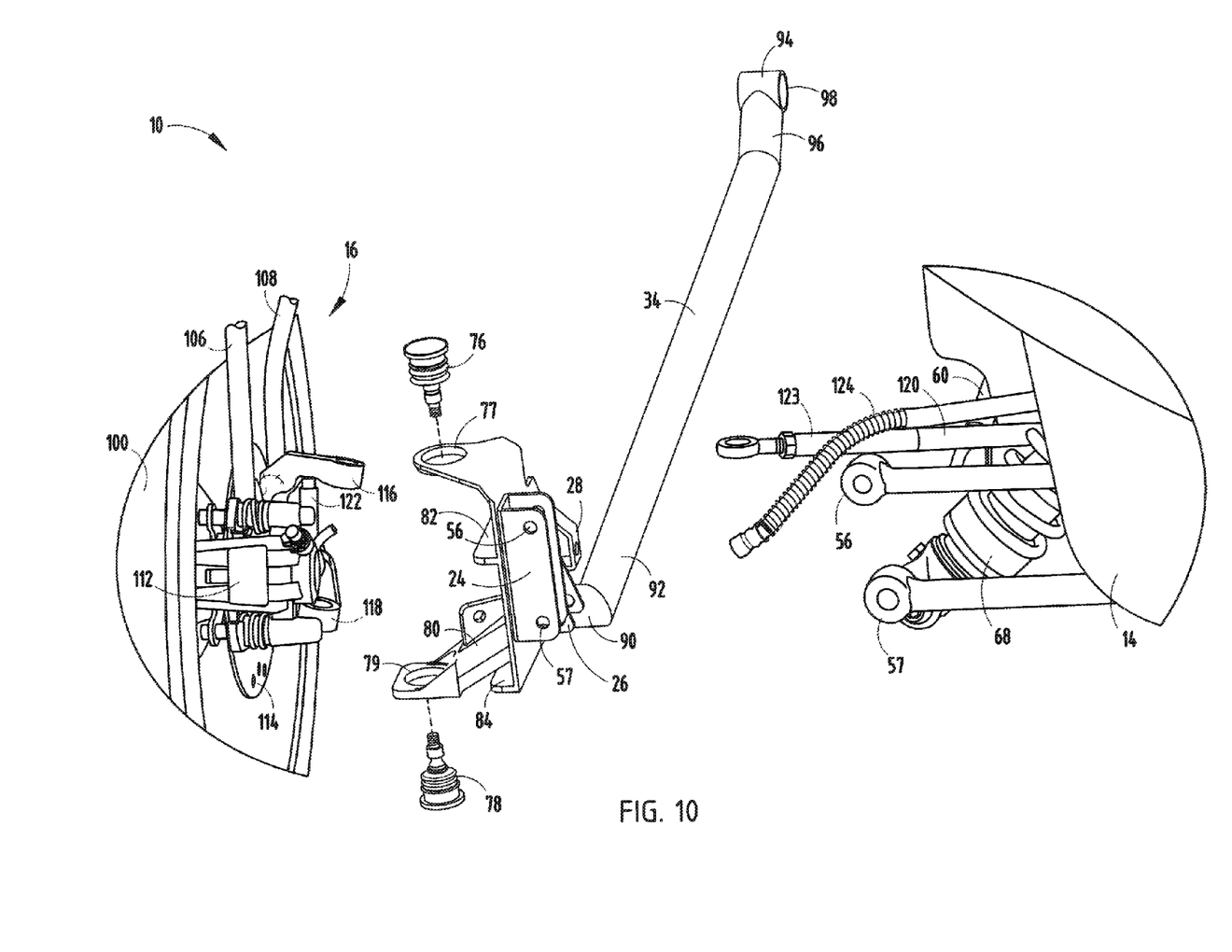
FIG. 10 is a front exploded perspective view of the wheeled vehicle during connection of a spindle assembly and wheel assembly.

Referring to FIGS. 4 and 5, the first and second spindle plates 20, 22 have mirror image constructions and include the same features. The features of the first spindle plate 20 are explained in detail below and it should be understood that these same features are all present on the second spindle plate 22. The spindle plate 20 and trailing arm 34 form a spindle assembly 47. A first, or interior, side 48 of the first spindle plate 20 includes the mount bracket 24, strut bracket 26, and torsion bar bracket 28. The mount bracket 24 on spindle plate 20 includes a U-shaped cross section with a base portion 50 that is fixedly connected, for example by welding, to the spindle plate 20. The mount bracket 24 includes top fastener apertures 52 and bottom fastener apertures 54 for engaging top and bottom mounting members 56, 57 (FIG. 10) that extend from the wheeled vehicle 14. The spindle plate 20 also includes the torsion bar bracket 28 adapted to connect with a torsion bar 60 that extends along a bottom portion 62 of the wheeled vehicle 14 and which connects with the torsion bar bracket 28 on the second spindle plate 22. Juxtaposed between the mount bracket 24 and the torsion bar bracket 28 is a strut bracket 26 having triangularly-shaped flanges 64. Each triangularly-shaped flange 64 includes fastener apertures 66 for engaging a strut 68 (FIG. 10) on the wheeled vehicle 14. A second, or external, side 70 of the spindle plate 20 includes top and bottom kingpin mounts 72, 74 designed for receiving and attaching with top and bottom kingpins 76, 78 (FIG. 10). The top kingpin mount 72 includes a top kingpin aperture 77 therethrough for receiving the top kingpin 76. The bottom kingpin 78 connects with bottom kingpin aperture 79 on a diagonally extending brace 80 that protrudes from the second side 70 of the spindle plate 20. In addition, first and second horizontal flanges 82, 84 are connected to the second side of the spindle plate 20 to provide additional rigidity to the spindle plate 20.

Referring now to FIGS. 6-8, a first portion 90 of the trailing arm 34 extends orthogonally from the first or internal side 48 of the spindle plate 20. A second portion 92 of the trailing arm 34 connects with the first portion 90 of the trailing arm 34 substantially orthogonally thereto and extends in a rearward direction towards the rear of the wheeled vehicle 14. A distal end 94 of the trailing arm 34 includes a slightly upwardly extending third portion 96 with a mounting aperture 98 extending therethrough. The trailing arm 34 provides an effective brace against rearward forces applied to the first and second wheel assemblies 16, 18 when the wheeled vehicle 14 is in motion.

Figure 9:
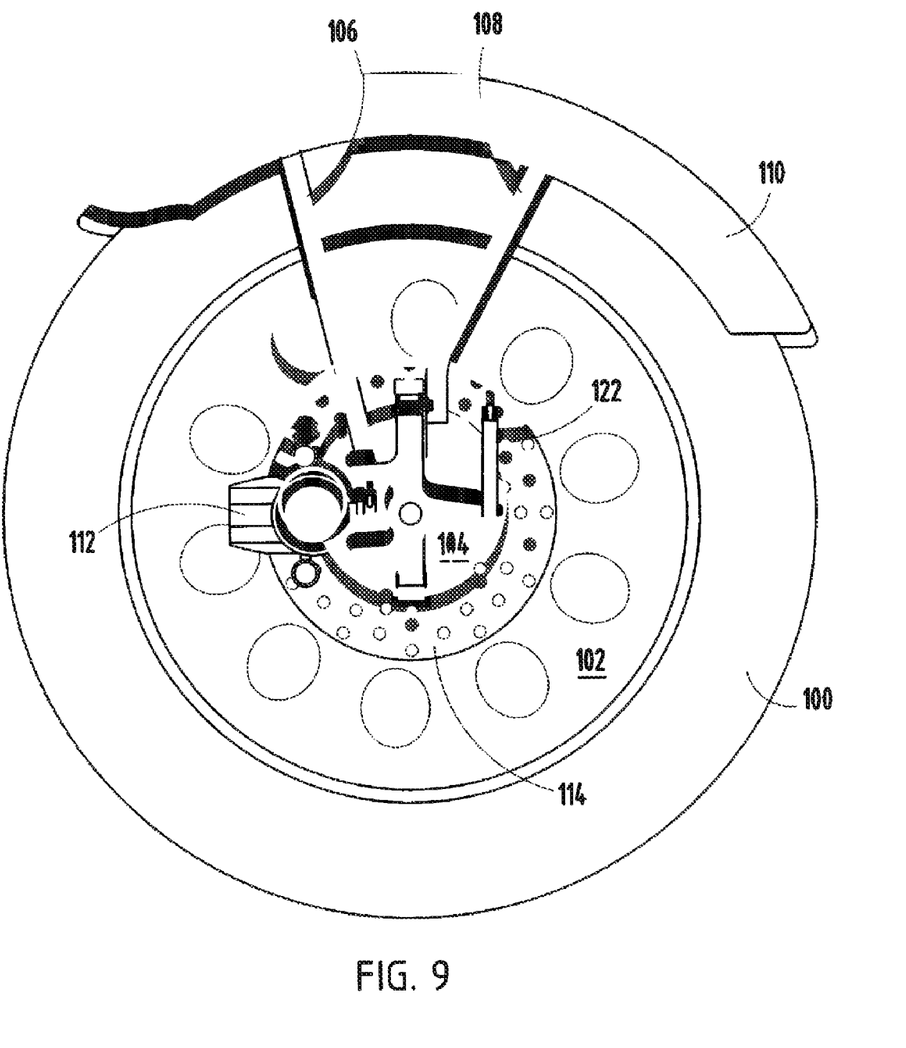
FIG. 9 is an interior side elevational view of a wheel assembly.

Referring now to FIG. 9, each of the first and second front wheel assemblies 16, 18 include a tire 100 connected to a rim 102 which is in turn rotatably connected to a hub portion 104. First and second fender supports 106, 108 extend upwardly from the hub portion 104 and secure a fender 110 above each wheel assembly 16, 18. Additionally, a braking system 112, such as the disk brakes 114 shown in FIG. 9, are secured to the rim 102 of each wheel assembly 16, 18 and are adapted to slow each wheel assembly 16, 18 during braking of the wheeled vehicle 14.

As shown in FIG. 10, to attach the wheel assembly 16 to the wheeled vehicle 14, the strut bracket 26 of the spindle plate 20 is first connected with the strut 68 of the wheeled vehicle 14. Next, the mount bracket 24 is connected with the top and bottom mounting members 56, 57 of the wheeled vehicle 14 to hold the spindle plate 20 in place. The torsion bar bracket 28 is connected with the torsion bar 60 that extends under the wheeled vehicle 14. Finally, the mounting aperture 98 at the distal end 94 of the trailing arm 34 is connected with a mounting bolt that extends from the wheeled vehicle 14. After the spindle plate 20 has been secured to the wheeled vehicle 14, the wheel assembly 16 is ready to be attached. The top and bottom kingpins 76, 78 extend through top and bottom kingpin apertures 77, 79 on the spindle plate 20 and are secured thereto, as shown in FIG. 3. The kingpins 76, 78 are then secured with top and bottom receiving members 116, 118 of the wheel assembly 16, a steering rod 120 is rotatably connected with a vertical steering member 122 on the wheel assembly 16. In the event the steering rod 120 is too short, a steering rod extension 123 may be installed so that the steering rod 120 can properly connect with the vertical steering member 122. The steering rod 120 pushes and pulls the vertical steering member 122 on the wheel assembly 16 to laterally rotate the tires 100 for the purpose of steering during use. A brake line 124 is connected with the disk brakes 114 and operates the brakes 114 hydraulically.

Figure 11:
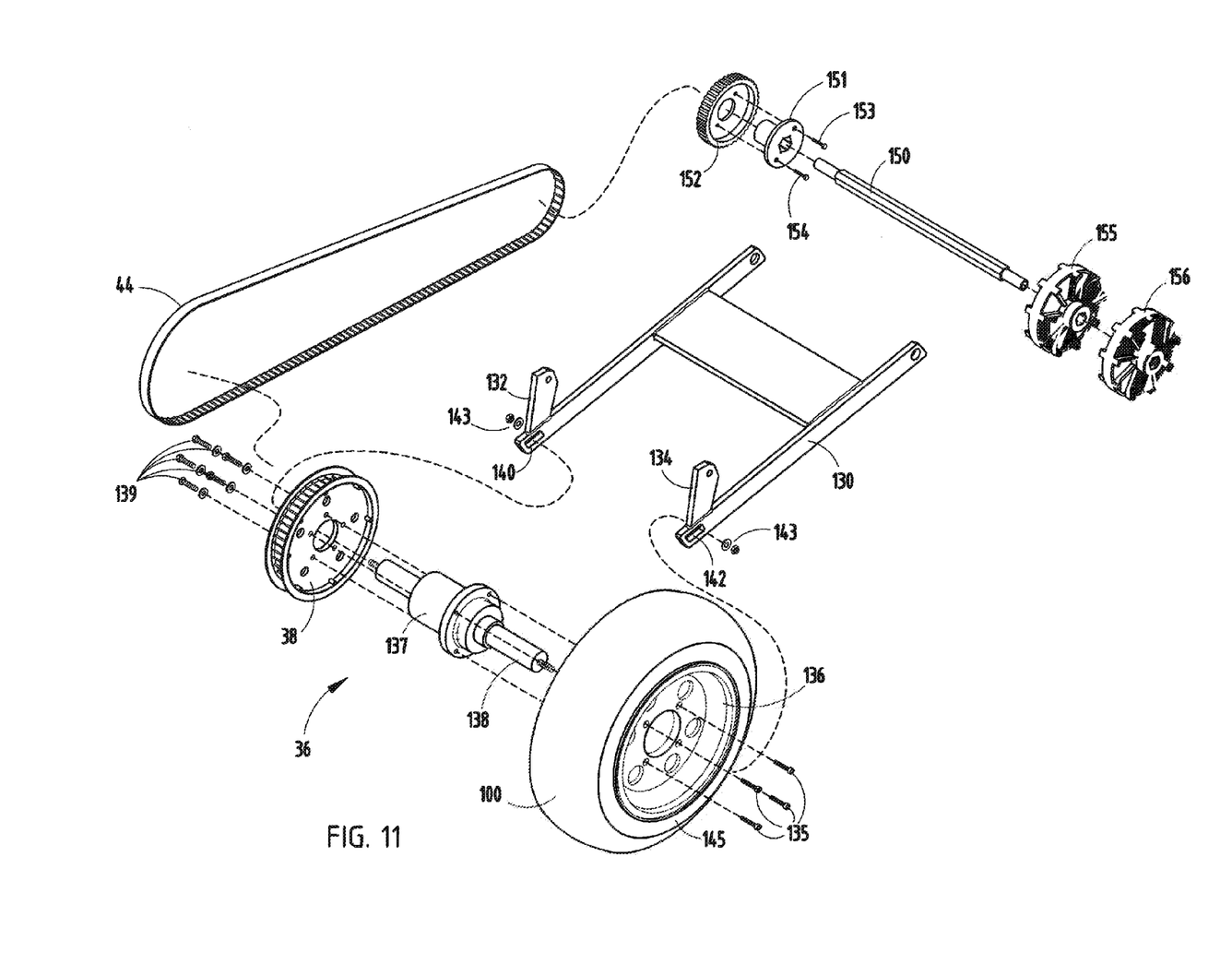
FIG. 11 is a top exploded perspective view of a rear wheel assembly of the present invention.
Figure 12:
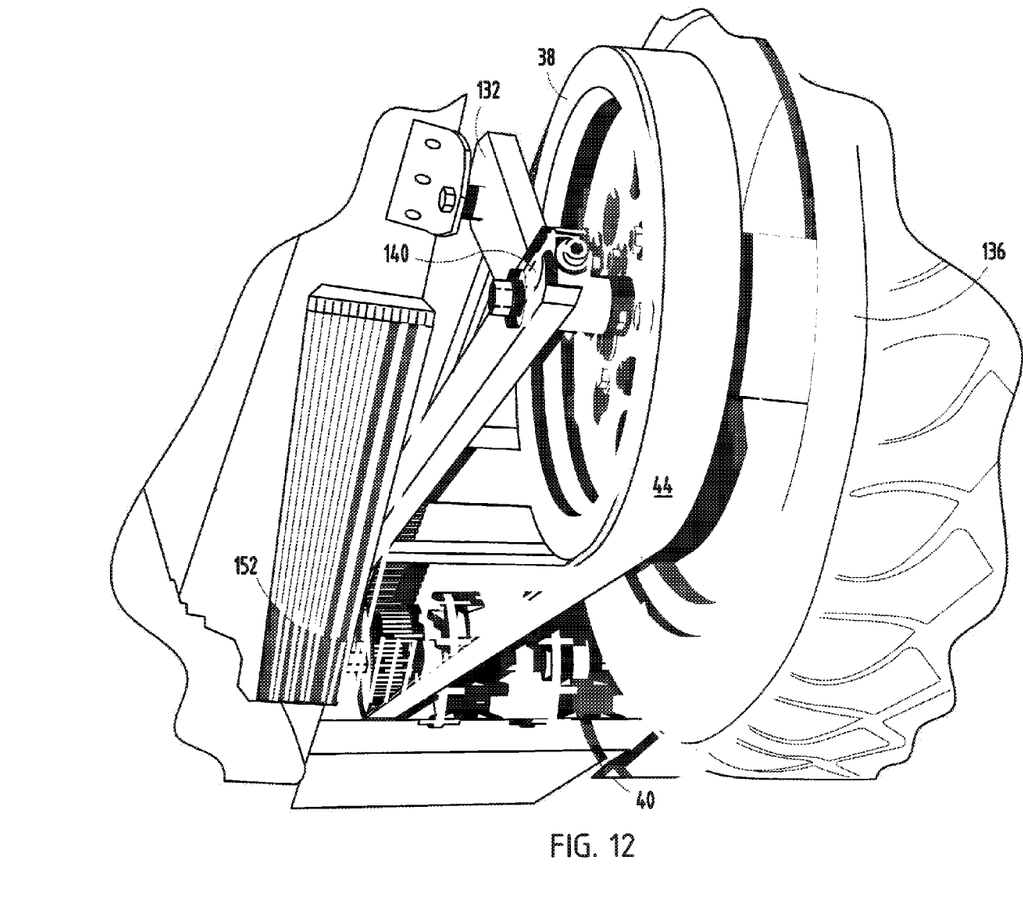
FIG. 12 is a partial bottom perspective view of the rear wheel assembly after installation on the wheeled vehicle.

Referring now to FIGS. 11 and 12, the rear wheel assembly 36 is connected to the underside of the wheeled vehicle 14 by connecting a swing arm 130 to the underside of the wheeled vehicle 14. The swing arm 130 includes upstanding connection members 132, 134 that connect to the rear of the wheeled vehicle 14. The rear wheel assembly 36, including a rear rim 136, a rear hub 137, an axle 138, and the rear sprocket 38, are then fixedly connected with bolts 135 securing the rim 136 to the rear hub 137 and bolts 139 securing the rear sprocket 38 to the rear hub 137. The rear wheel assembly 36 is then positioned between axle apertures 140, 142 and fastened with fasteners 143 on the swing arm 130 such that the wheel assembly 36, and therefore tire 145, can rotate relative to the rear swing arm 130. A forward drive shaft 150 in the wheeled vehicle 14 is removed and reinstalled over a sprocket receiver 151. The sprocket receiver 151 includes a hexagonal aperture for fitting engagement with the hexagonal outer perimeter of the drive shaft 150. The sprocket receiver 151 is connected to a drive sprocket 152 by fasteners 153 and 154. The drive sprocket 152 is operably connected to the drive belt 44 which in turn is operably connected to the sprocket 38. First and second track sprockets 155, 156 may be removed from the forward drive shaft 150 or left on the drive shaft 150. The drive shaft 150 is operably connected with the motor of the wheeled vehicle 14 such that the drive shaft 150 rotates when the motor is in gear. The drive sprocket 152 rotates as the drive shaft 150 rotates which consequently rotates the drive belt 44. As the drive belt 44 rotates, the rear sprocket 138 fixedly attached to the rear wheel 136 is forced to turn thereby turning the rear wheel 136 and moving the wheeled vehicle 14.

Various other modifications may also be added to the wheeled vehicle 14 (FIG. 1A) to prepare the wheeled vehicle 14 for road use. Such modifications include, but are not limited to, the addition of brake lights, turn signal lights, backup lights, hazard lights, a horn, an air-cooled forward radiator 160 (FIG. 2), etc. The addition of these components will depend on the owner's intended use. For example, if the particular engine of the snowmobile to be converted needs additional cooling to keep the wheeled vehicle running properly during summer months, a radiator may be installed.

The above description is considered that of the preferred embodiments only. Modifications of the invention will occur to those skilled in the art and to those who make or use the invention. Therefore, it is understood that the embodiments shown in the drawings and described above is merely for illustrative purposes and not intended to limit the scope of the invention, which is defined by the following claims as interpreted according to the principles of patent law, including the Doctrine of Equivalents.

The invention claimed is:

1. A conversion kit for converting a snowmobile into a wheeled vehicle, comprising:

first and second front wheel assemblies;

first and second spindle plates having a mount bracket, a strut bracket, a torsion bar bracket, and first and second kingpin assemblies, wherein said kingpin assemblies on said first and second spindle plates connect with said first and second front wheel assemblies;

a trailing arm integrally connected with said first and second spindle plates and extending rearwardly therefrom;

a rear wheel assembly rotatably connected with the wheeled vehicle and having a rear wheel sprocket fixedly connected thereto;

a drive shaft connected to a power source on the wheeled vehicle; and a drive belt connecting said drive shaft to said rear wheel sprocket.

2. The conversion kit of claim 1, wherein:
said mount bracket is rotatably connected with a top mount and a bottom mount.

3. The conversion kit of claim 2, further comprising:
a steering member integral with said spindle plate and rotatably connected with a steering link.

4. The conversion kit of claim 3, wherein:
said steering link includes a steering member extension.

5. The conversion kit of claim 4, further comprising:
a forward air-cooled radiator connected to a forward portion of the wheeled vehicle.

6. The conversion kit of claim 5, wherein:
said trailing arm includes a first short portion that is connected with and extends substantially orthogonally from the planar extent of said spindle plate and a second elongated portion that extends from said first short portion and that is substantially parallel with said spindle plate.

7. The conversion kit of claim 6, further comprising:
a forward brake assembly, including first and second disk brakes fixedly connected with said first and second front wheel assemblies.

8. The conversion kit of claim 7, wherein:
said drive shaft includes a front belt sprocket engaged with said drive belt.

9. In a conversion kit that converts a snowmobile into a three-wheeled road vehicle, the improvement comprising:
a spindle plate having a first side with a mounting bracket, a strut bracket, a torsion bar bracket, and a second side with first and second kingpin assemblies designed for engagement with a wheel assembly;

an arm connected with said first side of said spindle plate;

a rear swing arm attached to the wheeled vehicle and rotatably connected with a rear wheel assembly, said rear wheel assembly including a rear wheel with a rear wheel sprocket fixedly connected thereto;

a drive shaft connected to a power source on the wheeled vehicle; and a drive belt connected from said drive shaft to said rear wheel sprocket.

10. The conversion kit of claim 9, wherein:
said strut bracket is rotatably connected with a top strut and a bottom strut.

11. The conversion kit of claim 10, further comprising:
a steering member integral with said spindle plate and rotatably connected with a steering link.

12. The conversion kit of claim 11, wherein:
said steering link includes a steering member extension.

13. The conversion kit of claim 12, further comprising:
a forward air-cooled radiator connected to a forward portion of the wheeled vehicle.

14. The conversion kit of claim 13, wherein:
said arm includes a first short portion that is connected with and extends substantially orthogonally from the planar extent of said spindle plate and a second elongated portion that extends from said first short portion and that is substantially parallel with said spindle plate.

* * * * *